United States Patent
Hauschild et al.

(10) Patent No.: US 9,965,135 B2
(45) Date of Patent: May 8, 2018

(54) CONFIGURABLE METRICS AND METRIC VISUALIZATION

(71) Applicants: Christian Hauschild, Meinersen (DE); Benedikt Gabriel Steffan, Mannheim (DE); Christian Reinhardt, Heidelberg (DE); Thorben Krieger, Frankfurt (DE)

(72) Inventors: Christian Hauschild, Meinersen (DE); Benedikt Gabriel Steffan, Mannheim (DE); Christian Reinhardt, Heidelberg (DE); Thorben Krieger, Frankfurt (DE)

(73) Assignee: SAP SE, Walldorf (DE)

( * ) Notice: Subject to any disclaimer, the term of this patent is extended or adjusted under 35 U.S.C. 154(b) by 467 days.

(21) Appl. No.: 13/828,485

(22) Filed: Mar. 14, 2013

(65) Prior Publication Data
US 2014/0282053 A1    Sep. 18, 2014

(51) Int. Cl.
*G06F 3/0484* (2013.01)
*G06F 3/0481* (2013.01)
*G06F 9/44* (2018.01)

(52) U.S. Cl.
CPC .......... *G06F 3/0481* (2013.01); *G06F 9/4443* (2013.01)

(58) Field of Classification Search
CPC ...... G06Q 10/10; G06Q 10/06; G06Q 10/067; G06Q 10/103; G06Q 10/105; G06Q 10/1057; G06Q 50/24; G06Q 10/06393; G06Q 30/0269; G06Q 10/06313; G06Q 10/0635; G06Q 40/06; G06Q 10/0631; G06Q 10/06315; G06Q 40/00

USPC ......................................................... 705/35
See application file for complete search history.

(56) References Cited

U.S. PATENT DOCUMENTS

| | | | |
|---|---|---|---|
| 7,676,387 B2 | 3/2010 | Childress et al. | |
| 8,065,618 B2 | 11/2011 | Kumar et al. | |
| 2007/0239573 A1* | 10/2007 | Tien .................... | G06Q 10/06 705/35 |
| 2008/0115103 A1 | 5/2008 | Datars et al. | |
| 2008/0172629 A1* | 7/2008 | Tien .................... | G06Q 10/10 715/771 |
| 2011/0061013 A1* | 3/2011 | Bilicki .................. | G06Q 10/06 715/771 |

(Continued)

*Primary Examiner* — Amy Ng
*Assistant Examiner* — Tan H Tran
(74) *Attorney, Agent, or Firm* — Schwegman, Lundberg & Woessner, P.A.

(57) ABSTRACT

Various embodiments illustrated and described herein include one or more of systems, methods, and software providing for configurable metrics and metric visualizations with regard to company data. Such embodiments provide flexibility to users in defining metrics, such as Key Performance Indicators (KPI), and dashboard views. One such embodiment includes receiving a dashboard view request from a requestor. A dashboard configuration may then be retrieve from a database. The dashboard configuration typically includes various data elements that define either directly or by reference to other data and graphical elements from which a dashboard visualization can be rendered. The various data elements and graphical elements generally are user configurable and standardized to be interchangeable in defining and generating dashboard visualization based on underlying operational data of an organization.

17 Claims, 7 Drawing Sheets

(56) References Cited

U.S. PATENT DOCUMENTS

| | | |
|---|---|---|
| 2011/0210986 A1 | 9/2011 | Goutsev et al. |
| 2011/0214081 A1 | 9/2011 | Dobrin et al. |
| 2011/0246925 A1 | 10/2011 | Marchand et al. |
| 2011/0252321 A1 | 10/2011 | Handy et al. |
| 2012/0041990 A1* | 2/2012 | Kreindlina ........ G06F 17/30572 707/805 |
| 2012/0054334 A1 | 3/2012 | Befort |
| 2012/0089902 A1* | 4/2012 | Sheflin ................... G06Q 10/06 715/234 |
| 2012/0123989 A1 | 5/2012 | Yu et al. |
| 2012/0159359 A1 | 6/2012 | Ehrler et al. |
| 2013/0024760 A1 | 1/2013 | Vogel et al. |
| 2013/0262279 A1* | 10/2013 | Finley .................... G06Q 40/10 705/31 |
| 2013/0332472 A1* | 12/2013 | Vogel ................ G06F 17/30554 707/754 |
| 2014/0043337 A1 | 2/2014 | Cardno |

* cited by examiner

| | |
|---|---|
| Technical Name | ZCL_KPI_WHSE_FILL_RATE |

| | |
|---|---|
| Diplayname | Warehouse Fill Rate in % |
| ☑ KPI active | |
| Chart-Type | Gauge |
| ☑ Drilldown is active | |
| KPI Datapool Table | EST_KPI_WH_FILL |
| ID of Selscreen | |
| Minimum Value | 0,00000 |
| Max. Vlaue | 100,00000 |
| Range 1 | 90,00000 |
| Range 2 KPI | 96,00000 |
| Goal of the KPI | 3 |
| X-Axes Label | Date |
| Y-Axes Label | Fillrate |
| Number Datasets | 20 |
| Use of X-Axes | Use time as value for axes |
| Use of Y-Axes | Use the value as Y-Value |

CONFIGURABLE METRICS AND METRIC VISUALIZATION

BACKGROUND INFORMATION

In times of increasing competitive constraints and globalization, product life cycles and time for decisions become shorter for many companies. Furthermore, wrong management-decisions and late identified market-trends may have fatal consequences in rapidly evolving markets. For these reasons, management often monitors company, department, and market performance through metrics, to take appropriate real-time measures. Such measures are often provided in so-called dashboards, which may include graphical representations of business performance. Measures displayed in dashboards may include metrics, such as Key Performance Indicators (KPIs).

Metrics presented in dashboards typically are hard-coded interfaces specific to one or more metrics. To change, add, or remove metrics from a dashboard, each specific interface affected needs to be modified. Further, backend connections to data from which the metrics are generated may also need to be added to or changed. Such dashboards therefore are not nimble and fail to meet evolving market and business environment needs.

DETAILED DESCRIPTION

Various embodiments illustrated and described herein include one or more of systems, methods, and software providing for configurable metrics and metric visualizations with regard to company data. Such embodiments provide flexibility to users in defining metrics, such as Key Performance Indicators (KPI) and dashboard views. For example, some embodiments provide user tools through which metrics may be defined, copied and extended, and modified. Further embodiments provide user tools through which visualizations of metrics may be defined, such as by allowing for selection of one or more metrics to be visualized and parameters by which the visualization is to be generated. Additionally, user tools may provide an interface through which metric visualizations may be selected for inclusion in a dashboard view. A dashboard view, using such tools, may therefore be customized by a user to the user's specific needs without custom coding. Some such embodiments are generally built on a platform of standardized metric outputs that can be populated into a standardized metric visualization template according to a standardized form of metric visualization configuration. One or more standardized metric visualization configurations may then be added to a standardized dashboard configuration. A dashboard model may then generate a dashboard view from underlying operational data of an organization based on a standardized dashboard configuration and its constituent elements. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
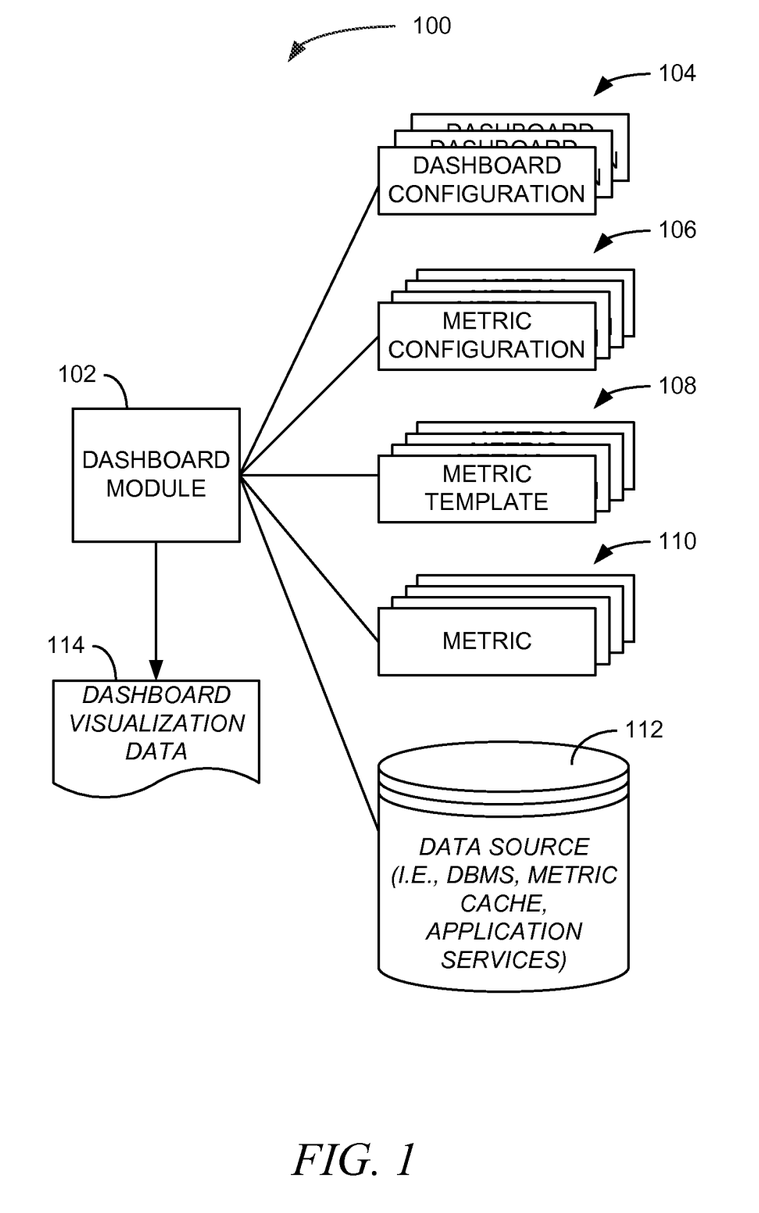
FIG. 1 is a logical illustration of a system according to an example embodiment.

FIG. 1 is a logical illustration of a system 100 according to an example embodiment. The system 100 is an example of a dashboard module 102 that is executed to generate dashboard visualization data 114. Dashboard visualization data 114, in some embodiments, is data that can be rendered to present a view of a dashboard including graphical and textual representations of one or more metrics, such as KPIs. Examples of dashboard visualization data 114 may include web pages or data that will form a portion of a web page, one or more image files (i.e., .JPG, .GIF, .BMP, .TIF, and other file types), and other data from which a computing device, application, or app can generate a viewable image from on a display. Dashboard visualization data 114 may be output by the dashboard module 102, in some embodiments, as one or more image files. In other embodiments, the dashboard visualization data 114 may be output in an eXtensible Markup Language (XML) form from which a web browser, application, or mobile device app generates a dashboard view including one or more graphical and textual metric representations. In yet further embodiments, the dashboard visualization data 114 may be output by the dashboard module in a document file that can be presented.

The dashboard module 102, in some embodiments, executes on an application server or as a portion of or in cooperation with an enterprise application, such as an enterprise resource planning (ERP), customer relationship management (CRM), logistics, or other application. Some such applications are available from SAP AG of Walldorf, Germany. In yet further embodiments, the dashboard module 102 may execute on a client computing device as a standalone application or app, or a portion thereof, that accesses data stored locally to the computing device or is accessible via a network on the client computing device. The client computing device, in such embodiments, may be a personal computer, a smartphone, a tablet device, a media player, or other computing device.

The dashboard module 102 executes to generate dashboard views of metrics, such as KPIs. In generating a dashboard view, the dashboard module 102 leverages different elements of data that fit together in a standardized format to be compatible with each other in an interchangeable manner. These data elements include metrics 110, metric templates 108, metric configurations 106, and dashboard configurations 104.

A metric 110 is typically a defined formula that calculates metric data from underlying data identified in the metric and stored in or accessible via a system, such as a database 112 or a service of an application, such as an ERP application. A metric 110 may include executable code, a service call, a database retrieval statement (SQL), or other data reference that is used to obtain one or more calculated values or data and to calculate metric data therefrom. As illustrated, the system 100 may include multiple metrics 110.

In some embodiments, when a calculation of a metric 110 is performed to obtain metric 110 data, the metric 110 data may be cached, such as in database 112, one or more files, or other data storage location. Some metrics 110 may involve complex, data intensive data retrieval and processing. To avoid excessive consumption of computing resources, the metric 110 is cached in some embodiments and can be available in a predetermined form. The cache stores previously calculated metric 110 data. In some such embodiments, cached metric 110 data may be cached with a date-time stamp for consideration by a user as to whether or not the cached metric 110 data is current enough for the user's purposes.

The caching of metric 110 data may be performed on a schedule basis. For example, a data processing job may execute on a schedule basis with regard to certain or all metrics 110 to obtain metric 110 data from each metric 110 and store the obtained metric 110 data in the cache. In other embodiments, metric 110 data may be calculated when currently cached data of a metric 110 is older than a configured expiration duration since calculation, such as at a time of request or upon a metric 110 data monitoring process noting cached metric 110 data is passed the expiration duration or at a time when an item of metric 110 date is requested from the cache. Other embodiments may calculate metric 110 data at different times and utilize other metric 110 data caching schemes.

Metric data templates 108 are generic templates that can be populated with metric 110 data according to a metric configuration 106. Metric templates 108 are consumable by the dashboard module 102 to generate metric visualization data 114. Some metric templates 108 may provide graphical visualizations, while others may provide text-based visualizations, such as data populated to one or more tables. In some embodiments, metric templates 108 are callable graphical chart rendering objects of an application or application add on. The SAP Crystal Dashboard Design product available form SAP AG of Walldorf, Germany is an example of a software tool providing such graphical chart rendering objects. In such embodiments, the callable graphical chart rendering objects can be called with data in a defined format to obtain a chart rendering based on the data provided in the defined format. Data to be provided in a defined format typically includes data a chart is to represent along with additional labeling and formatting parameters for the chart to be created. In addition, different callable graphical chart rendering objects may be included for obtaining charts of different types, such as pie charts, line graphs, speedometer or gauge-style charts, bar charts, among others.

In some embodiments, metrics 110 and metric templates 108 are tied together by a metric configuration 106. A metric configuration 106 typically identifies a metric 110, a metric template 108, and maps metric 110 data elements to portions of the metric template 108 where the metric 110 data elements are to be presented. A metric configuration 106 may further include details such as colors, font options, labels, size or increment definitions for presenting data such as in graphs, tables, and the like of a metric template 108. In some embodiments, the mapping of metric 110 data elements to portions of the metric template 108 are provided in the form of call to a callable graphical chart-rendering object as described above. In such embodiments, the metric 110 data elements are mapped to portions of the call such that when the metric 110 data is obtained by the dashboard module 102, the dashboard module 102 can populate the metric 110 data into the mapped portions of the call and submit the call to a callable graphical chart rendering object identified in the metric configuration 106.

In some embodiment, the dashboard module 102 generates a dashboard view based on a dashboard configuration 104 of a user. The dashboard configuration 104 of the user may be specific to the user. However, in other embodiments, the dashboard configuration 104 from which a user's dashboard view is generated may be a dashboard configuration 104 of a company, department, product line, market segment, or other unit of which the user is a part or for which the user is responsible. In further embodiments, the user's dashboard configuration 104 may be assigned to a role held by the user.

Regardless of how a user's dashboard configuration 104 is assigned and determined, a dashboard configuration, in some embodiments, identifies one or more metric configurations 106 to be included in a user's dashboard view. Further, a dashboard configuration typically includes a user identifier, role identifier, department identifier, or other identifier associating the dashboard configuration to one or more users or groups of user.

The dashboard configurations 104, metric configurations 106, metric templates 108, metrics 110, cached metric data and system data stored in the database 112, are utilized in concert by the dashboard module 102 to generate dashboard visualization data 114 from which a dashboard view can be rendered. For example, in some embodiments, the dashboard module 102 generates a dashboard visualization data 114 including data from which visualizations of metric 110 data can be generated based on one or more metric configurations 106. The dashboard module 102 may generate the dashboard visualization data 114 based on a received or retrieved user identifier.

The dashboard module 102 will typically receive a dashboard visualization data 102 request including a user identifier from an app, application, web browser, or other source. The dashboard module 102 will then retrieve a dashboard configuration 104 based on the user identifier. From the retrieved dashboard configuration 104, the dashboard module 102 will identify and retrieve each metric configuration identified in the dashboard configuration 104. Next, the dashboard module 102, in such embodiments, will obtain metric 110 data either from the metric data cache or through a call of each metric 110. The dashboard module 102 will then generate a visualization based on each metric configuration 106 retrieved base on the obtained metric data and other respective metric configuration 106 parameters (i.e., labels, colors, fonts, etc.). Generating of the visualizations may include calling one or more graphical chart rendering objects that may be part of the dashboard module 102, an accessible web service, or an application programming interface (API) otherwise available on a computing device on which the dashboard module 102 executes. Upon generation of the metric visualizations, the dashboard module 102 will then assemble the metric visualizations as defined in the dashboard configuration 104 and perform any additional processing that may be need, such as generating a single image file, XML file, and the like. The dashboard visualization data is then generated and can be presented by the dashboard module 102 or provided to a source from which the dashboard visualization data 102 request was received.

In some embodiments, the dashboard module 102 may further include one or user interface through which a user may configure a dashboard visualization. For example, user interfaces may allow for users to create, update, and delete dashboard configurations 104, metric configurations 108, and metrics 110. Data accessed by such user interfaces is typically stored in the database 112, but may alternatively be stored in other locations and data structures, such as files on server or on a computing device on which the dashboard module 102 executes. Examples of some such user interfaces are presented in FIG. 3, FIG. 4, and FIG. 5.

Figure 2:
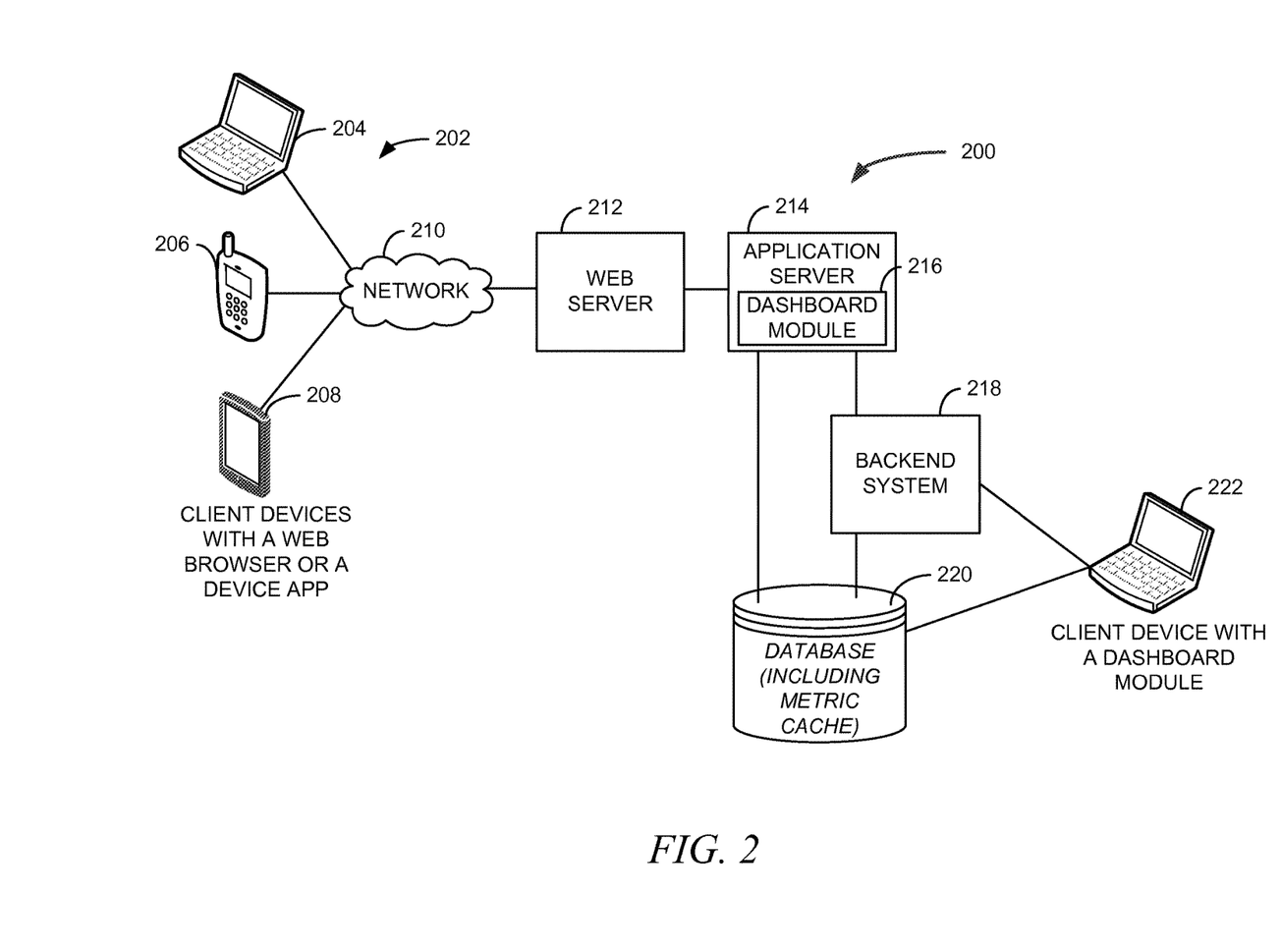
FIG. 2 is a logical illustration of a system according to an example embodiment.

FIG. 2 is a logical illustration of a system 200 according to an example embodiment. The system 200 is an example computing environment within which various embodiments may be implemented.

In some embodiments, client devices 202, such as personal computers 204, smartphones 206, and tablet devices 208 may include an app, application, or web browser through which dashboard visualization data may be obtained and viewed. The client devices 202 are connected to a network 210, such as the Internet. Also connected to the network 210, in some embodiments, is a web server 212 that provides access to web pages and other data that may be retrieved either from files or through applications that execute at least in part on an application server 214. The application server 214 may include a dashboard module 216, that may access data, such as data from which a dashboard visualization may be generated, stored in a database 220, accessible from a backend system 218, such as an enterprise-class application, or stored or accessible from other locations. However, in some embodiments, a dashboard module may also or alternatively be present on a client computing device 222, such as on a client computing device 222 connected to one or both of the backend system 218 and the database 220 via an internal company network, such as a local area network.

Figure 3:
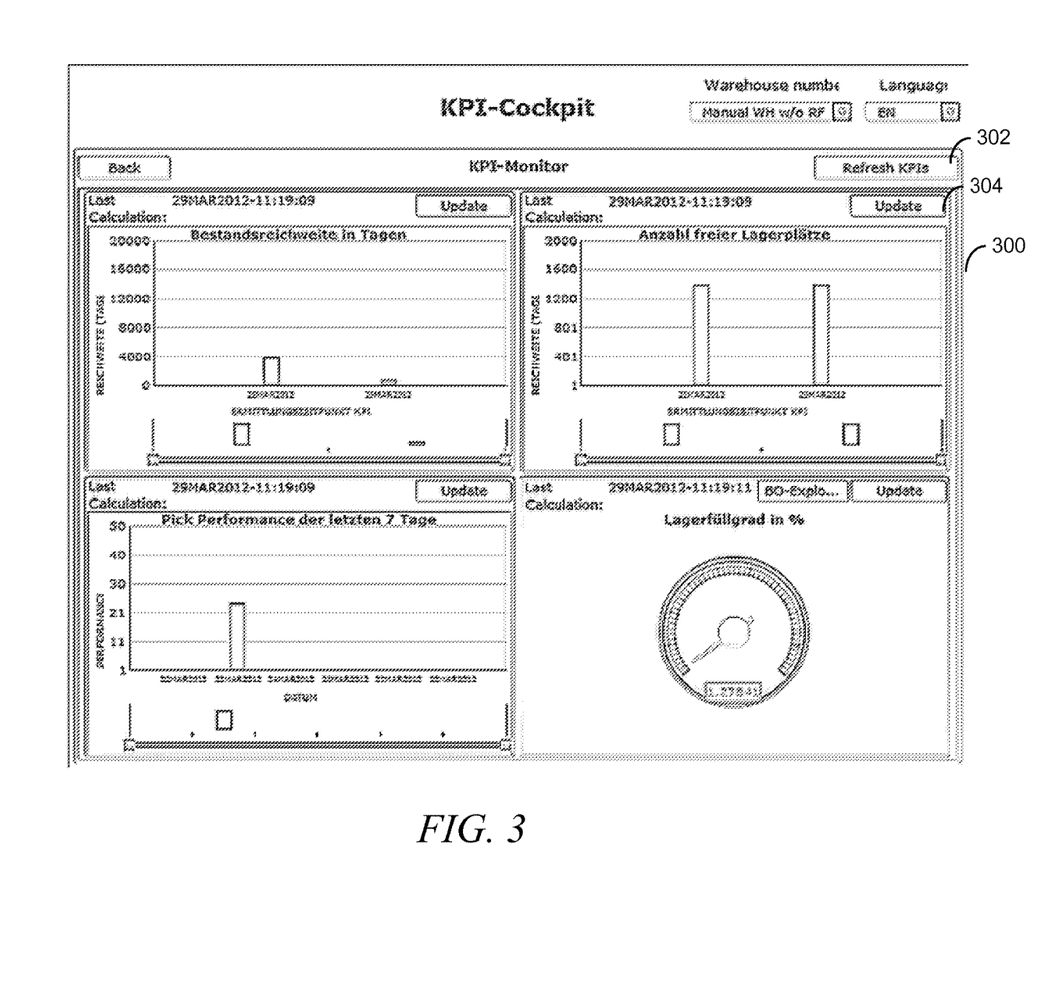
FIG. 3 is a user interface illustration, according to an example embodiment.

FIG. 3 is a user interface 300 illustration, according to an example embodiment. The user interface 300 is an example of a dashboard visualization rendered from dashboard visualization data, such as dashboard visualization data 114 output by the dashboard module 102 of FIG. 1. As illustrated, the user interface includes four metric visualizations generated based on four different metric configurations. Each of the four metric visualizations includes a graphical element that represents metric data. Further, each of the four metric visualizations includes labels as also specified in respective metric configurations. The labels of each of the four metric visualizations are provided in the German language. In such an embodiment, the dashboard visualization was generated for presentation a user based on the user's identifier, an associated dashboard configuration, and profile data associated with the user's identifier indicating the user is to be presented user interface text in the German language where it is available. Thus, the metric configurations in this embodiment, rather than including explicit labels for inclusion in the metric visualizations instead include references to data sources from which language or regionalize label text can be obtained based on user language or region preferences. The data sources form which the language or regionalize label text can be obtained may include one or more database tables, application services, web services, and other data sources.

The user interface 300, in some embodiments, includes a REFRESH KPI's action button. Selection of the REFRESH KPI's action button causes a request to be sent to a dashboard module to refresh the dashboard visualization. The refresh may be in whole or in part and is performed to update the dashboard visualization to reflect any changes in the data from which the metric visualizations are generated.

Each metric visualization included in the user interface 300 dashboard visualization also includes an UPDATE action button. Selection of an UPDATE button will cause the respective metric visualization to be recalculated and the view thereof refreshed. One or more other action buttons may be included in the user interface, which when selected may cause another user interface to be presented to provide the user an ability to modify a configuration of one or more of a metric configuration underlying the respective metric visualization or the underlying dashboard configuration. An example of such another user interface is illustrated in FIG. 4 and provides a tool through which the user can modify metric configurations included in the dashboard visualization included in the user interface 300.

Figure 4:
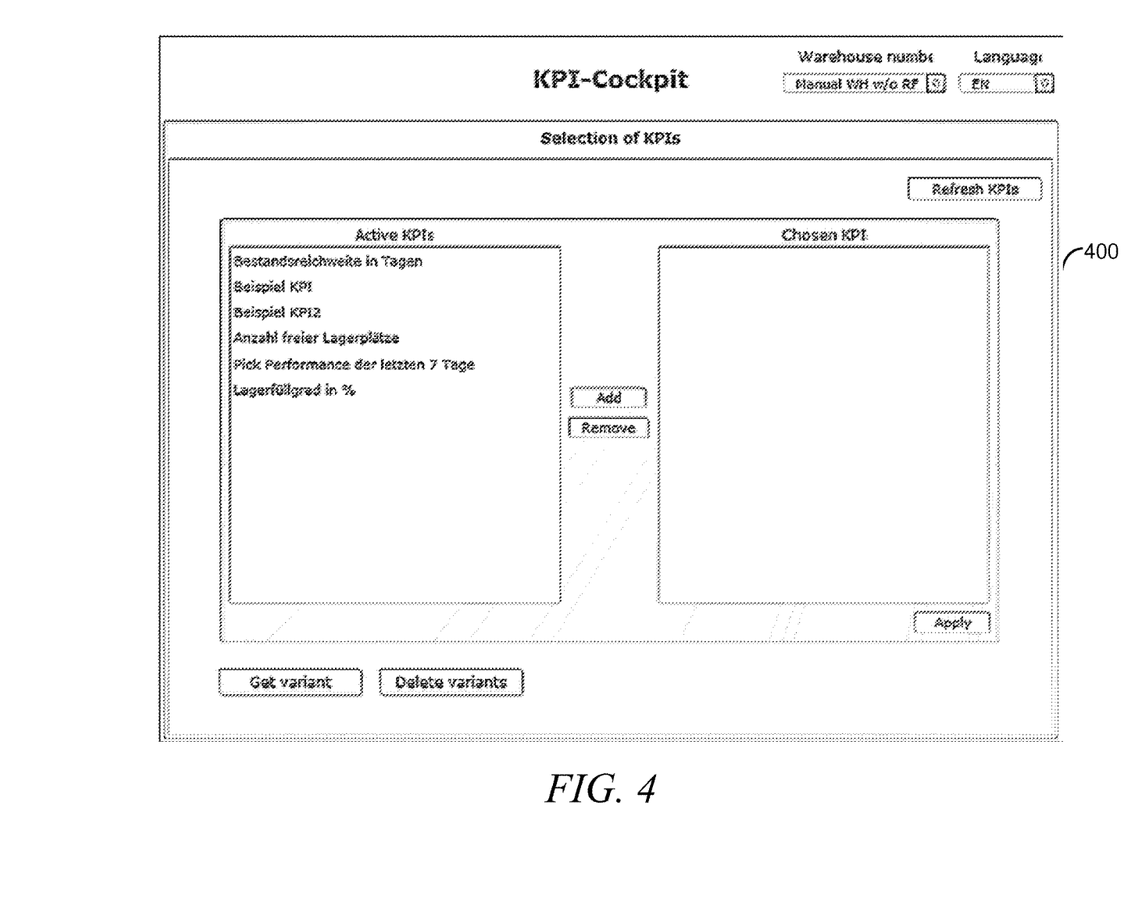
FIG. 4 is a user interface illustration, according to an example embodiment.

FIG. 4 is a user interface 400 illustration, according to an example embodiment. The user interface 400 provides a tool through which a user can modify metric configurations included in a dashboard visualization such as presented in the user interface 300 of FIG. 3. The user interface 400 is populated with data retrieved from a current dashboard configuration and metric configurations. The data is typically retrieved from and stored to a database, although some embodiments may store such data in other locations. The user interface includes a listing of ACTIVE KPIs that correspond to metric configurations 106 of FIG. 1. The ACTIVE KPIs presented can be selected and added to a CHOSEN KPI listing. Once an acceptable selection of ACTIVE KPIs have been added to the CHOSEN KPI listing, an APPLY action button can be selected and the user interface 400 will be closed.

In the event a user desires to edit, create, or delete metric configuration, such as with regard to one of the listing of ACTIVE KPIs, different commands may be made. For example, within the user interface 400 commands may be input, such as a double click of a listed ACTIVE KPI, selection of an action button such as the GET VARIANT or DELETE VARIANT action buttons, or a menu item, to open a metric configuration editing user interface. Such a metric configuration editing user interface is presented in FIG. 5.

Figure 5:
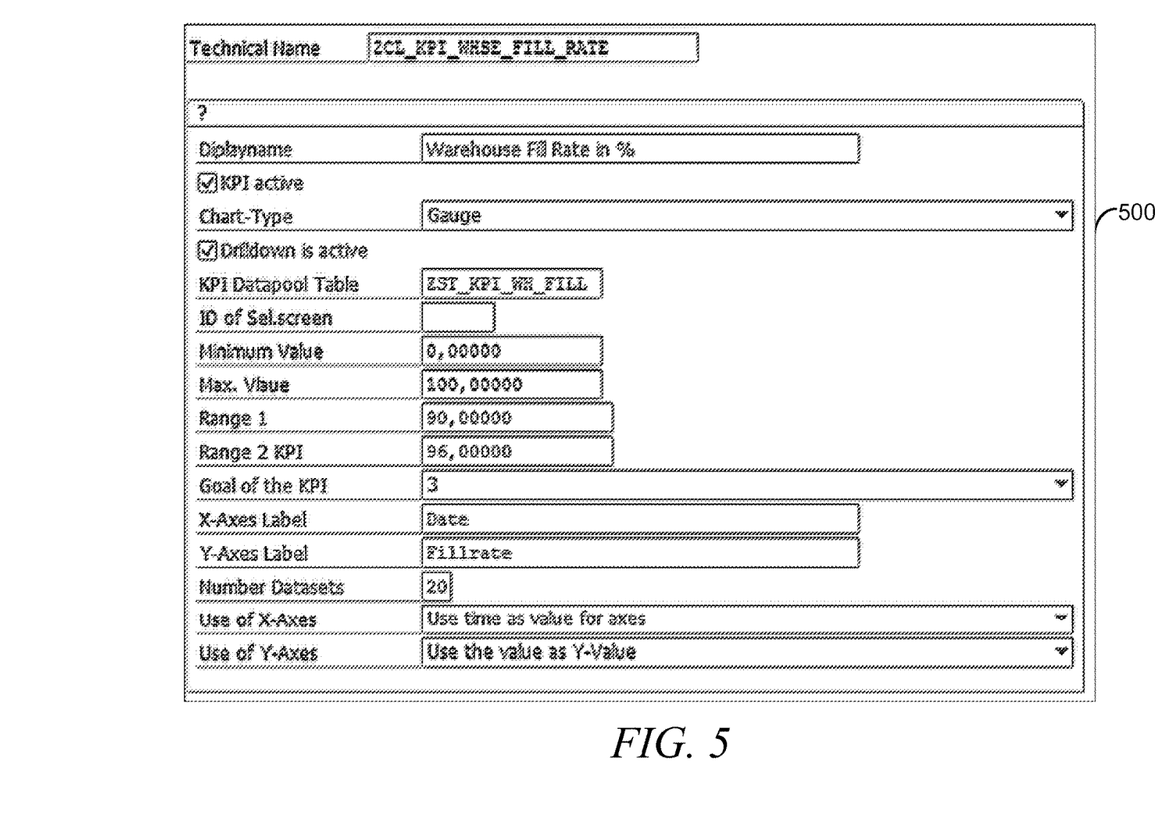
FIG. 5 is a user interface illustration, according to an example embodiment.

FIG. 5 is a user interface 500 illustration, according to an example embodiment. The user interface 500 is an example of a user interface that may be included in some embodiments to provide users a tool to edit a metric configuration as retrieved from and stored in a database or other storage location. The user interface 500 presents a set of metric configuration options. The metric configuration options may allow a user to specify a metric from which data is to be obtained, a chart type a visualization of the metric, and other options that may be metric or chart type specific, such as labels. The other options may also include data ranges for the chart type when a visualization is generated, numbers of data sets to present, a data range for which metric data is to be presented (i.e., the metric data for each of the last 12 months), interactive options for the visualization such as activation of data drilldown capabilities to view data at different granularities, and the like.

Figure 6:
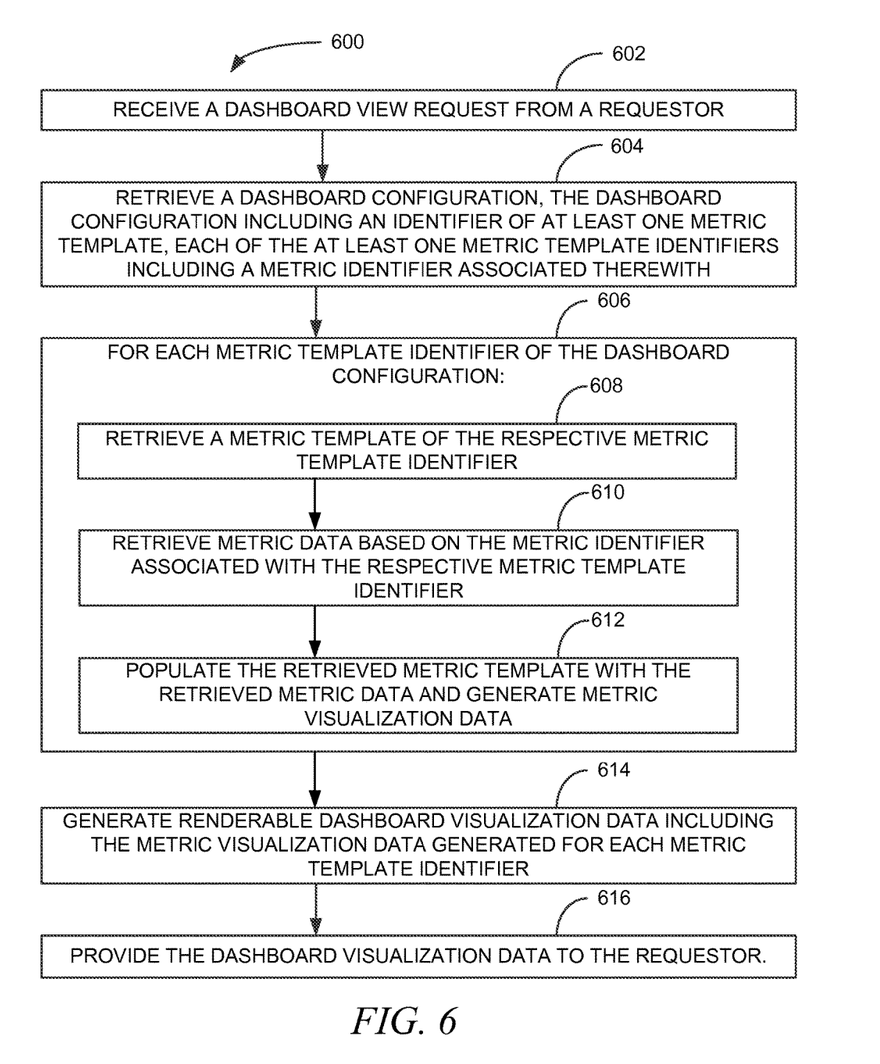
FIG. 6 is a block flow diagram of a method, according to an example embodiment.

FIG. 6 is a block flow diagram of a method 600, according to an example embodiment. The method 600 is an example of a how the dashboard module 102 of FIG. 1 may execute in some embodiments.

The method 600 includes receiving 602 a dashboard view request from a requestor, such as may have originated in a mobile device app, a web browser, thick-client application, or other source. In response to the received 602 request, the method 600 includes retrieving 604 a dashboard configuration. The retrieved 604 dashboard configuration typically includes an identifier of at least one metric template. Each of the at least one metric template identifiers includes a metric identifier associated therewith.

The method 600 proceeds for each 606 metric template identifier by retrieving 608 a metric template of the respective metric template identifier and retrieving 610 metric data based on the metric identifier associated with the respective metric template identifier. The metric data may be retrieved by calling a metric process with reference to a particular metric. In other embodiments, metric data may be retrieved from a metric data cache that stores previously calculated metric data. In some such embodiments, when the metric data is retrieved from the metric data cache, an age of the obtained metric data may be determined and when the cached metric data is determined to be out of date, the metric data may be recalculated, cached, and provided. In yet another embodiment, a metric template may require metric data calculated at different times. In such instances, a portion of the metric data may be obtained from the metric data cache and another portion obtained by recalculating the metric data based on the metric.

The method 600 then populates 612 the retrieved metric template with the retrieved metric data and generates metric visualization data based thereon. The method 600 then similarly proceeds with the remaining template identifiers for which metric visualization data has not yet been generated.

Once metric visualization data has been generated with regard to each of the at least one metric template identifiers, the method 600 then proceed by generating 614 renderable dashboard visualization data including the metric visualization data generated for each metric template identifier. The dashboard visualization data is then provided to the requestor, which may include transmitting the data over a network when the request was received over the network.

In some embodiments of the method 600, each identifier of the at least one metric template and the metric identifier associated therewith is included in the dashboard configuration by association. The association may be to a metric configuration provided by a metric configuration identifier included in the dashboard configuration. In such embodiments, the method 600 may further include retrieving, from a database, the metric configuration of each metric configuration identifier included in the dashboard configuration. In some such embodiments, at least one retrieved metric configuration may include additional configuration data such as a mapping of metric data items to portions of the respective metric template and a label of a data or graphical element of the respective metric template. The method 600 may then populate 612 the retrieved 610 metric template with the retrieved metric data according to the mapping of metric data items to portions of the respective metric template. Further, generating metric visualization data may include adding labels to the metric visualization data according to the at least one label of a data or graphical element of the respective metric template.

In some embodiments, of the method 600 each metric template includes standardized elements to allow the populating 612 of the metric templates with retrieved metric data and the generating of the metric visualization data based on the metric templates to be performed in a standardized manner.

Figure 7:
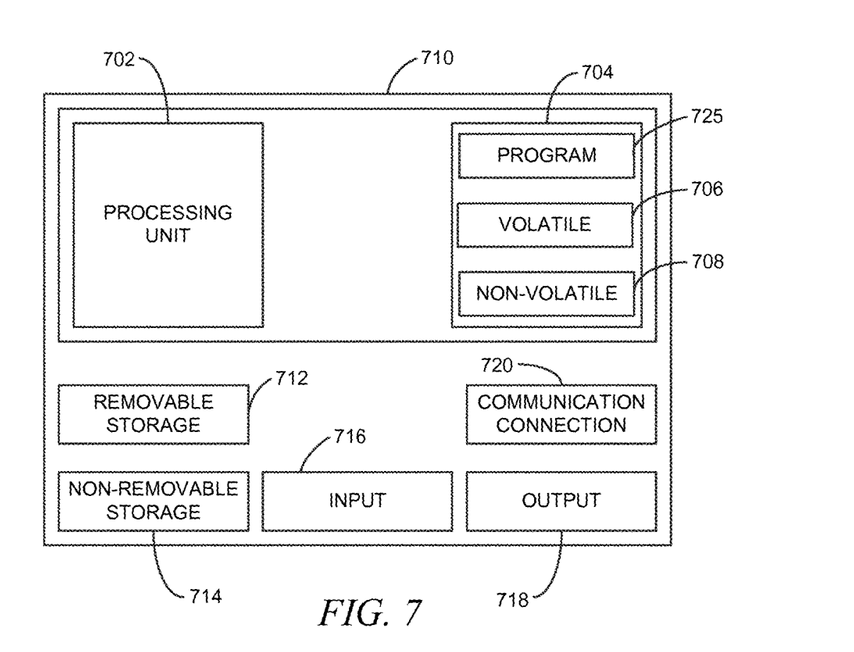
FIG. 7 is a block diagram of a computing device, according to an example embodiment.

FIG. 7 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Although the example computing device is illustrated and described as computer 710, the computing device may be in different forms in different embodiments. For example, the computing device may instead be a smartphone, a tablet, or other computing device including the same or similar elements as illustrated and described with regard to FIG. 7. Further, although the various data storage elements are illustrated as part of the computer 710, the storage may also or alternatively include cloud-based storage accessible via a network, such as the Internet.

Returning to the computer 710, memory 704 may include volatile memory 706 and non-volatile memory 708. Computer 710 may include—or have access to a computing environment that includes a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The input 716 may include one or more of a touchscreen, touchpad, mouse, keyboard, camera, and other input devices. The computer may operate in a networked environment using a communication connection 720 to connect to one or more remote computers, such as database servers, web servers, and other computing device. An example remote computer may include a personal computer (PC), server, router, network PC, a peer device or other common network node, or the like. The communication connection 720 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 702 of the computer 710. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving a dashboard view request from a requestor;
   retrieving a dashboard configuration corresponding to the dashboard view request, the dashboard configuration including an identifier of at least one metric template of a plurality of metric templates, each of the at least one metric templates including a metric identifier associated therewith;
   for each metric template identifier of the dashboard configuration:
      retrieving a metric template of the respective metric template identifier;
      retrieving metric data based on the metric identifier associated with the respective metric template identifier, the retrieved metric data characterized by at least one metric data type;
      mapping the metric data type to a portion of the retrieved metric template corresponding to the metric template identifier; and
      populating the retrieved metric template with the retrieved metric data based on the mapping and generating metric visualization data;
   generating renderable dashboard visualization data including the metric visualization data generated for each metric template identifier based on the populated metric template;
   providing the dashboard visualization data to the requestor; and
   wherein each metric template includes standardized elements to allow the populating of the metric templates with retrieved metric data and the generating of the metric visualization data based on the metric templates to be performed in a standardized manner.

2. The method of claim 1, wherein the requestor is a web browser application and dashboard visualization data is provided in a form renderable within the web browser application.

3. The method of claim 1, wherein each identifier of the at least one metric template and the metric identifier associated therewith is included in the dashboard configuration by association to a metric configuration provided by a metric configuration identifier included in the dashboard configuration, the method, further comprising:
   retrieving the metric configuration of each metric configuration identifier included in the dashboard configuration.

4. The method of claim 3, wherein:
   at least one retrieved metric configuration includes additional configuration data, the additional configuration data including:
      the mapping of the metric data type to the portion of the metric template corresponding to the metric template identifier; and
      at least one label of a data or graphical element of the respective metric template;
   populating of the retrieved metric template with the retrieved metric data is performed according to the mapping of metric data type to portions of the respective metric template; and
   generating metric visualization data includes adding labels to the metric visualization data according to the at least one label of a data or graphical element of the respective metric template.

5. The method of claim 1, wherein retrieving metric data includes retrieving metric data from a metric data cache of previously calculated metric data.

6. The method of claim 1, wherein at least one metric template includes a graphical chart template.

7. A non-transitory computer-readable storage medium, with instructions stored thereon, which when executed by at least one processor of at least one computing device, cause the at least one computing device to:
   receive a dashboard view request from a requestor;
   retrieve a dashboard configuration corresponding to the dashboard view request, the dashboard configuration including an identifier of at least one metric template of a plurality of metric templates, each of the at least one metric template templates including a metric identifier associated therewith;
   for each metric template identifier of the dashboard configuration:
      retrieve a metric template of the respective metric template identifier;
      retrieve metric data based on the metric identifier associated with the respective metric template identifier, the retrieved metric data characterized by at least one metric data type;
      mapping the metric data type to a portion of the retrieved metric template corresponding to the metric template identifier; and
      populate the retrieved metric template with the retrieved metric data based on the mapping and generate metric visualization data;
   generate renderable dashboard visualization data including the metric visualization data generated for each metric template identifier based on the populated metric template;
   provide the dashboard visualization data to the requestor; and
   wherein each metric template includes standardized elements to allow the populating of the metric templates with retrieved metric data and the generating of the metric visualization data based on the metric templates to be performed in a standardized manner.

8. The non-transitory computer-readable storage medium of claim 7, wherein the requestor is a mobile device app and dashboard visualization data is provided in a form renderable within the mobile device app.

9. The non-transitory computer-readable storage medium of claim 7, wherein each identifier of the at least one metric template and the metric identifier associated therewith is included in the dashboard configuration by association to a metric configuration provided by a metric configuration identifier included in the dashboard configuration, the instructions further executable by the at least one processor to cause the at least one computing device to:
retrieve the metric configuration of each metric configuration identifier included in the dashboard configuration.

10. The non-transitory computer-readable storage medium of claim 9, wherein:
at least one retrieved metric configuration includes additional configuration data, the additional configuration data including:
the mapping of the metric data type to the portion of the metric template corresponding to the metric template identifier; and
at least one label of a data or graphical element of the respective metric template;
populating of the retrieved metric template with the retrieved metric data is performed according to the mapping of metric data type to portions of the respective metric template; and
generating metric visualization data includes adding labels to the metric visualization data according to the at least one label of a data or graphical element of the respective metric template.

11. The non-transitory computer-readable storage medium of claim 7, wherein retrieving metric data includes retrieving metric data from a metric data cache of previously calculated metric data.

12. The non-transitory computer-readable storage medium of claim 11, wherein:
generated metric visualization data includes a renderable user interface control defined therein, which when rendered and selected causes a refresh of metric data included in the metric visualization data to be requested and received from a data source.

13. A system comprising:
at least one processor, at least one memory device, and at least one network interface device;
a dashboard module stored on the at least one memory device and executable by the at least one processor to:
receive, via the at least one network interface, a dashboard view request from a requestor;
retrieve a dashboard configuration corresponding to the dashboard view request, the dashboard configuration including an identifier of at least one metric template of a plurality of metric templates, each of the at least one metric templates including a metric identifier associated therewith;
for each metric template identifier of the dashboard configuration:
retrieve a metric template of the respective metric template identifier;
retrieve, via the at least one network interface device, metric data based on the metric identifier associated with the respective metric template identifier, the retrieved metric data characterized by at least one metric data type;
mapping the metric data type to a portion of the retrieved metric template corresponding to the metric template identifier; and
populate the retrieved metric template with the retrieved metric data based on the mapping and generate metric visualization data;
generate renderable dashboard visualization data including the metric visualization data generated for each metric template identifier based on the populated metric template;
provide, via the at least one network interface device, the dashboard visualization data to the requestor; and
wherein each metric template includes standardized elements to allow the populating of the metric templates with retrieved metric data and the generating of the metric visualization data based on the metric templates to be performed in a standardized manner.

14. The system of claim 13, wherein each identifier of the at least one metric template and the metric identifier associated therewith is included in the dashboard configuration by association to a metric configuration provided by a metric configuration identifier included in the dashboard configuration, the dashboard module further executable to:
retrieve the metric configuration of each metric configuration identifier included in the dashboard configuration.

15. The system of claim 14, wherein:
at least one retrieved metric configuration includes additional configuration data, the additional configuration data including:
the mapping of the metric data type to the portion of the metric template corresponding to the metric template identifier; and
at least one label of a data or graphical element of the respective metric template;
populating of the retrieved metric template with the retrieved metric data is performed according to the mapping of metric data type to portions of the respective metric template; and
generating metric visualization data includes adding labels to the metric visualization data according to the at least one label of a data or graphical element of the respective metric template.

16. The system of claim 13, wherein retrieving metric data includes retrieving metric data from a metric data cache of previously calculated metric data.

17. The system of claim 16, wherein:
generated metric visualization data includes a renderable user interface control defined therein, which when rendered and selected causes a refresh of metric data included in the metric visualization data to be requested and received from a data source.

* * * * *